(12) United States Patent
Nakamoto et al.

(10) Patent No.: US 12,107,436 B1
(45) Date of Patent: Oct. 1, 2024

(54) WIRELESS-POWER TRANSFER APPARATUS, WIRELESS-POWER TRANSFER SYSTEM, METHOD AND PROGRAM

(71) Applicant: SoftBank Corp., Tokyo (JP)

(72) Inventors: Yuta Nakamoto, Tokyo (JP); Naoki Hasegawa, Tokyo (JP); HoYu Lin, Tokyo (JP); Takafumi Fujii, Tokyo (JP); Sachiko Takeuchi, Tokyo (JP); Yoshichika Ota, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/706,413

(22) PCT Filed: Oct. 21, 2022

(86) PCT No.: PCT/JP2022/039398
§ 371 (c)(1),
(2) Date: May 1, 2024

(87) PCT Pub. No.: WO2023/085054
PCT Pub. Date: May 19, 2023

(30) Foreign Application Priority Data

Nov. 9, 2021 (JP) ................................. 2021-182632

(51) Int. Cl.
*H02J 50/40* (2016.01)
*H02J 50/20* (2016.01)
(Continued)

(52) U.S. Cl.
CPC ............ *H02J 50/20* (2016.02); *H02J 50/402* (2020.01); *H02J 50/80* (2016.02); *H02J 50/90* (2016.02);
(Continued)

(58) Field of Classification Search
CPC ......................... H04B 7/06952; H04L 5/0048
(Continued)

(56) References Cited

U.S. PATENT DOCUMENTS

| 10,396,859 B1 * | 8/2019 | Hong ...................... H04W 4/80 |
| 2019/0157912 A1 | 5/2019 | Taniguchi et al. |
| 2022/0045557 A1 * | 2/2022 | Lee .......................... H02J 50/20 |

FOREIGN PATENT DOCUMENTS

| JP | 2019-097302 A | 6/2019 |
| JP | 2019-193422 A | 10/2019 |

(Continued)

OTHER PUBLICATIONS

International Preliminary Report on Patentability Dated for PCT Application No. PCT/JP2022/039398, May 2, 2024.
(Continued)

*Primary Examiner* — Kiet M Doan
(74) *Attorney, Agent, or Firm* — Muirhead and Saturnelli, LLC

(57) ABSTRACT

Provided is a wireless-power transfer apparatus capable of efficiently supplying a predetermined power for each of plural terminal apparatuses. A wireless-power transfer apparatus comprises a radio processing section for transmitting a signal for wireless power transfer to each of the plural terminal apparatuses via plural beams, by a beamforming for forming the plural beams against the plural terminal apparatuses simultaneously or at staggered times, an information acquisition section for acquiring terminal information including location information of a current location of a terminal apparatus for each of plural terminal apparatuses, and a control section for controlling the beamforming so that a signal for wireless power transfer is received at a prede-
(Continued)

termined reception power in each of plural terminal apparatuses, based on terminal information of each of plural terminal apparatuses.

18 Claims, 7 Drawing Sheets

(51) Int. Cl.
  *H02J 50/80* (2016.01)
  *H02J 50/90* (2016.01)
  *H04B 7/0408* (2017.01)
  *H04B 7/0452* (2017.01)
  *H04B 7/06* (2006.01)
  *H01Q 3/36* (2006.01)

(52) U.S. Cl.
  CPC ......... *H04B 7/0408* (2013.01); *H04B 7/0452* (2013.01); *H04B 7/0617* (2013.01); *H01Q 3/36* (2013.01)

(58) Field of Classification Search
  USPC .................. 375/262; 307/104; 455/562.1
  See application file for complete search history.

(56) References Cited

FOREIGN PATENT DOCUMENTS

| JP | 2020-167822 A | 10/2020 |
| WO | WO 2017/164220 A1 | 9/2017 |
| WO | WO 2019/208331 A1 | 10/2019 |

OTHER PUBLICATIONS

International Search Report and Written Opinion Dated for PCT Application No. PCT/JP2022/039398, Dec. 13, 2022.
Notice for Reasons of Refusal for Japanese Patent Application No. 2021-182632, Dated Nov. 29, 2022.
Decision to Grant a Patent for Japanese Patent Application No. 2021-182632, Dated Mar. 3, 2023.

* cited by examiner

WIRELESS-POWER TRANSFER APPARATUS, WIRELESS-POWER TRANSFER SYSTEM, METHOD AND PROGRAM

TECHNICAL FIELD

The present invention relates to a wireless-power transfer apparatus, a wireless-power transfer system, a method and a program for wirelessly transmitting a power to plural terminal apparatuses.

BACKGROUND ART

There is conventionally known a communication system that performs a communication between a base station (a communication relay apparatus) and a terminal apparatus using at least some of plural radio resources set in a radio frame (see, for example, Patent Literature 1).

CITATION LIST

Patent Literature

Patent Literature 1: International Publication No. 2017/164220.

SUMMARY OF INVENTION

Technical Problem

As a terminal apparatus that connects and communicates with a communication relay apparatus such as a base station, a wireless-LAN access point apparatus or the like in a conventional communication system, there is a portable terminal apparatus that mainly uses an electric power supplied from a built-in battery. In this terminal apparatus, it is necessary to perform a complicated task of charging the built-in battery when the remaining capacity of the built-in battery becomes low. A terminal apparatus that uses an electric power supplied from a wired-connection power line rather than the built-in battery is limited to use in a location where such power line is available. A power supply infrastructure, which can supply a power to various terminal apparatuses that connect to communication relay apparatuses such as base stations, etc. and perform communication in this way, is not yet developed.

In the fifth generation and the subsequent next generation communication systems, it is expected that the number of terminal apparatuses (for example, user apparatuses, IoT devices, etc.) that connect to the communication relay apparatus such as the base station, wireless-LAN access point apparatus or the like and communicate will rapidly increase, and a communication infrastructure is being developed to handle the huge amount of traffic. However, the power supply infrastructure capable of supplying the power to the huge number of terminal apparatuses that perform the above communication remains underdeveloped.

Solution to Problem

A wireless-power transfer apparatus according to an aspect of the present invention is a wireless-power transfer apparatus for wirelessly transmitting power to plural terminal apparatuses. This wireless-power transfer apparatus comprises a radio processing section for transmitting a signal for wireless power transfer to each of the plural terminal apparatuses via plural beams, by a beamforming that forms the plural beams against the plural terminal apparatuses simultaneously or at staggered times, an information acquisition section for acquiring terminal information including location information of a current location of the terminal apparatus for each of the plural terminal apparatuses, and a control section for controlling the beamforming so that the signal for wireless power transfer is received at a predetermined reception power in each of the plural terminal apparatuses, based on the terminal information of each of the plural terminal apparatuses.

A system according to another aspect of the present invention comprises the foregoing wireless-power transfer apparatus and plural terminal apparatuses. Each of the plural terminal apparatuses has a radio processing section for receiving the signal for wireless power transfer transmitted from the wireless-power transfer apparatus, and a power output section for outputting a power of reception signal that is acquired by receiving the signal for wireless power transfer, as a reception power.

A method according to yet another aspect of the present invention is a method for wirelessly transmitting power to plural terminal apparatuses. This method includes transmitting a signal for wireless power transfer to each of the plural terminal apparatuses via plural beams, by a beamforming for forming the plural beams against the plural terminal apparatuses simultaneously or at staggered times, acquiring terminal information including location information of a current location of the terminal apparatus for each of the plural terminal apparatuses, and controlling the beamforming so that the signal for wireless power transfer is received at a predetermined reception power in each of the plural terminal apparatuses, based on the terminal information of each of the plural terminal apparatuses.

A program according to yet another aspect of the present invention is a program executed by a computer or processor provided in a wireless-power transfer apparatus for wirelessly transmitting power to plural terminal apparatuses. This program includes a program code for transmitting a signal for wireless power transfer to each of the plural terminal apparatuses via plural beams, by a beamforming for forming the plural beams against the plural terminal apparatuses simultaneously or at staggered times, a program code for acquiring terminal information including location information of a current location of the terminal apparatus for each of the plural terminal apparatuses, and a program code for controlling the beamforming so that the signal for wireless power transfer is received at a predetermined reception power in each of the plural terminal apparatuses, based on the terminal information of each of the plural terminal apparatuses.

In the foregoing wireless-power transfer apparatus, the wireless-power transfer system, the foregoing method and the foregoing program, it may be switched between a beamforming for long distance in which the plural beams are formed in a time-division manner and a beamforming for short distance in which the plural beams are simultaneously formed, based on a distance from the wireless-power transfer apparatus to each of the plural terminal apparatuses.

In the foregoing wireless-power transfer apparatus, the wireless-power transfer system, the foregoing method and the foregoing program, the beam may be controlled to be formed by the beamforming for long distance against plural terminal apparatuses that are located at locations where the distance is longer than a predetermined reference distance among the plural terminal apparatuses, and the beam may be controlled to be formed by the beamforming for short distance against plural terminal apparatuses that are located at locations where the distance is shorter than or equal to the predetermined reference distance.

In the foregoing wireless-power transfer apparatus, the wireless-power transfer system, the foregoing method and the foregoing program, the radio processing section of the wireless-power transfer apparatus may have an array antenna in which plural antenna elements are disposed two-dimensionally or three-dimensionally, and plural signal generation sections that are provided to correspond to the plural antenna elements and generate the signal for wireless power transfer, and the radio processing section may change a phase or both of a phase and an amplitude of the signal for wireless power transfer that is respectively supplied to the plural antenna elements, based on beam-forming control information from the control section.

In the foregoing wireless-power transfer apparatus, the wireless-power transfer system, the foregoing method and the foregoing program, the terminal information may include charging information on a battery provided in each of the plural terminal apparatuses, and the beamforming may be controlled to turn on and off a beam formation against the terminal apparatus based on the charging information, for each of the plural terminal apparatuses.

In the foregoing wireless-power transfer apparatus, the wireless-power transfer system, the foregoing method and the foregoing program, the terminal information may include charging information on a battery provided in each of the plural terminal apparatuses, and the beamforming may be controlled to change a type of the beam formed against the terminal apparatus based on the charging information, for each of the plural terminal apparatuses.

In the foregoing wireless-power transfer apparatus, the wireless-power transfer system, the foregoing method and the foregoing program, the wireless-power transfer apparatus may be concurrently used as a communication relay apparatus capable of performing a radio communication with the plural terminal apparatuses.

In the foregoing wireless-power transfer apparatus, the wireless-power transfer system, the foregoing method and the foregoing program, the wireless-power transfer apparatus may have a first-radio processing section for performing a radio communication with each of the plural terminal apparatuses via an antenna for communication, and a second-radio processing section for transmitting the signal for wireless power transfer to each of the plural terminal apparatuses via an antenna for power transfer by the beamforming.

In the foregoing wireless-power transfer apparatus, the wireless-power transfer system, the foregoing method and the foregoing program, the wireless-power transfer apparatus may be a base station of a mobile communication system or an access point apparatus of a wireless LAN.

In the foregoing wireless-power transfer apparatus, the wireless-power transfer system, the foregoing method and the foregoing program, each of the plural terminal apparatuses may have a first-radio processing section for performing a radio communication with the communication relay apparatus via an antenna for communication, and a second-radio processing section for receiving the signal for wireless power transfer from the communication relay apparatus via an antenna for power transfer.

Advantageous Effects of Invention

According to the present invention, it is possible to efficiently supply a predetermined power to each of plural terminal apparatuses.

DESCRIPTION OF EMBODIMENTS

Hereinafter, embodiments of the present invention are described with reference to the drawings.

A wireless-power transfer apparatus according to the embodiment described herein transmits signals for wireless power transfer to each of plural terminal apparatuses via plural beams, by a beamforming that forms plural beams simultaneously or at staggered times for each of plural terminal apparatuses (for example, IoT devices with communication function) capable of communicating with a communication relay apparatus such as a base station of a mobile communication, a wireless-LAN access point apparatus (AP), etc. The wireless-power transfer apparatus can efficiently supply a predetermined power to each of the plural terminal apparatuses, by acquiring terminal information including location information of a current location of the terminal apparatus for each of the plural terminal apparatuses, and controlling the beamforming so that a signal for wireless power transfer is received at a predetermined reception power in each of the plural terminal apparatuses, based on the terminal information of each of the plural terminal apparatuses.

It is noted that in the following embodiments, although a case in which a wireless power transfer (WPT) system is configured by using a communication relay apparatus (mobile-communication base station) concurrently serving as a wireless-power transfer apparatus is explained, a wireless-power transfer (WPT) system may be configured in which a power is respectively supplied to plural terminal apparatuses from a wireless-power transfer apparatus provided separately from the mobile-communication base station. The system of the present embodiment may be configured as a communication system (mobile communication system) in which the communication relay apparatus (mobile-communication base station) has the function of the wireless-power transfer apparatus. Further, the communication relay apparatus of the present embodiment may be a wireless-LAN access point apparatus.

Figure 1:
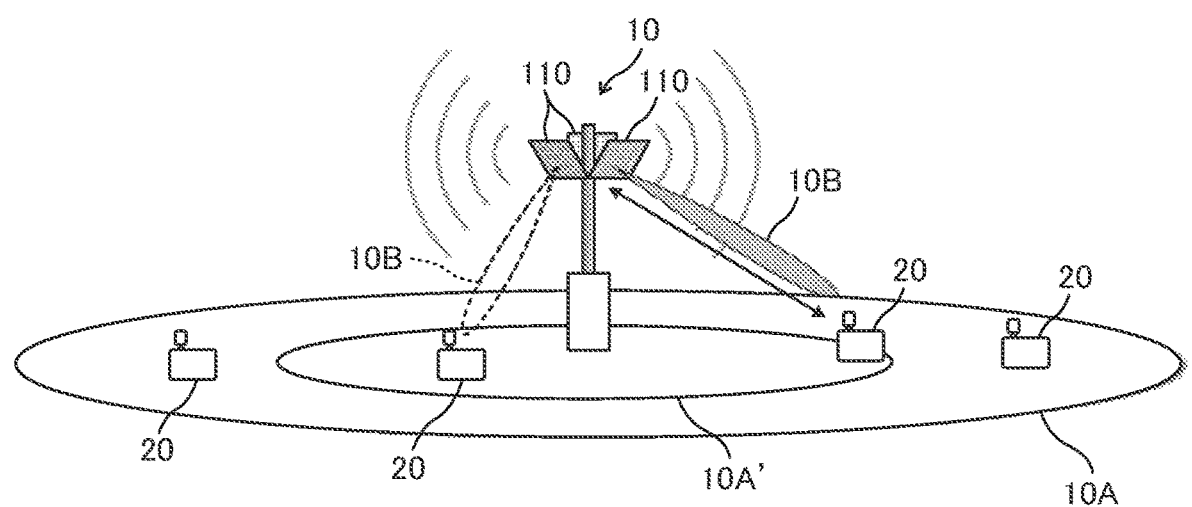
FIG. 1 is an illustration showing an example of a schematic configuration of a wireless-power transfer system according to an embodiment.

FIG. 1 is an illustration showing an example of a schematic configuration of the wireless-power transfer system according to the present embodiment. The wireless-power transfer system of the present embodiment includes a cellular base station 10 for forming a communication area (cell) 10A, and a terminal apparatus (hereinafter also referred to as "UE" (user equipment)) 20 that connects to the base station 10 and is capable of performing a radio communicating with the base station 10 when locating in the communication area 10A.

The UE 20 may be a mobile station of a mobile communication system, or may be a combination of a communication apparatus (for example, a mobile communication module) and each of various kinds of devices.

In FIG. 1, the base station 10 is provided with plural array antennas 110 having a large number of antenna elements, and is capable of performing a communication of massive MIMO (hereinafter also referred to as "mMIMO") transmission method with plural UEs 20. The mMIMO is a radio transmission technology that achieves a high-capacity/high-speed communication by transmitting and receiving data using the array antenna 110. A communication can be performed using an MU (Multi User)-MIMO transmission method in which a beamforming is performed to form beams 10B in time division or simultaneously for each of the plural UEs 20. By performing the MU-MIMO transmission using the multi-element array antenna 110, it is possible to communicate by directing an appropriate beam against each UE 20 according to a communication environment of each UE 20, thereby the communication quality of the entire cell can be improved. Further, since it is capable communicating with plural UEs 20 using the same radio resource (time/frequency resource), a system capacity can be expanded.

In FIG. 1, a part of the communication area 10A is a wireless power transfer area (hereinafter referred to as "WPT area") 10A' where a wireless power transfer is performed from the base station 10 toward the terminal apparatus 20. The WPT area 10A' may be a smaller area than the communication area 10A as shown in the figure, or may be an area having the same or approximately the same size and position as the communication area 10A.

In the WPT area 10A', a signal for wireless power transfer is transmitted from the base station 10 to each of the plural UEs 20. For transmitting signals for wireless power transfer, for example, communication-unused radio resources (resource blocks) that are not used for communication among the resource blocks, which are plural radio resources (time/frequency resources) constituting a downlink radio frame from the base station 10, may be utilized as wireless-power transfer blocks. In the downlink radio frame to the UE 20, the base station 10 may generate a transmission signal in which a dummy signal (hereinafter also referred to as "dummy signal for WPT") as a signal for wireless power transfer is allocated to a wireless-power transfer block (WPT block) that is a communication-unused radio resource, and transmit the generated transmission signal to the UE 20.

Especially in the fifth generation or the subsequent next generation mobile communication systems, a technology as a lean carrier is proposed, in which the minimum necessary reference signals (RS) and control signals are placed only on some subcarriers of a radio frame, and it is expected that the wireless power transfer to the UE 20 can be performed by effectively utilizing the part of the communication-unused radio resources in the radio frame.

Figure 2:
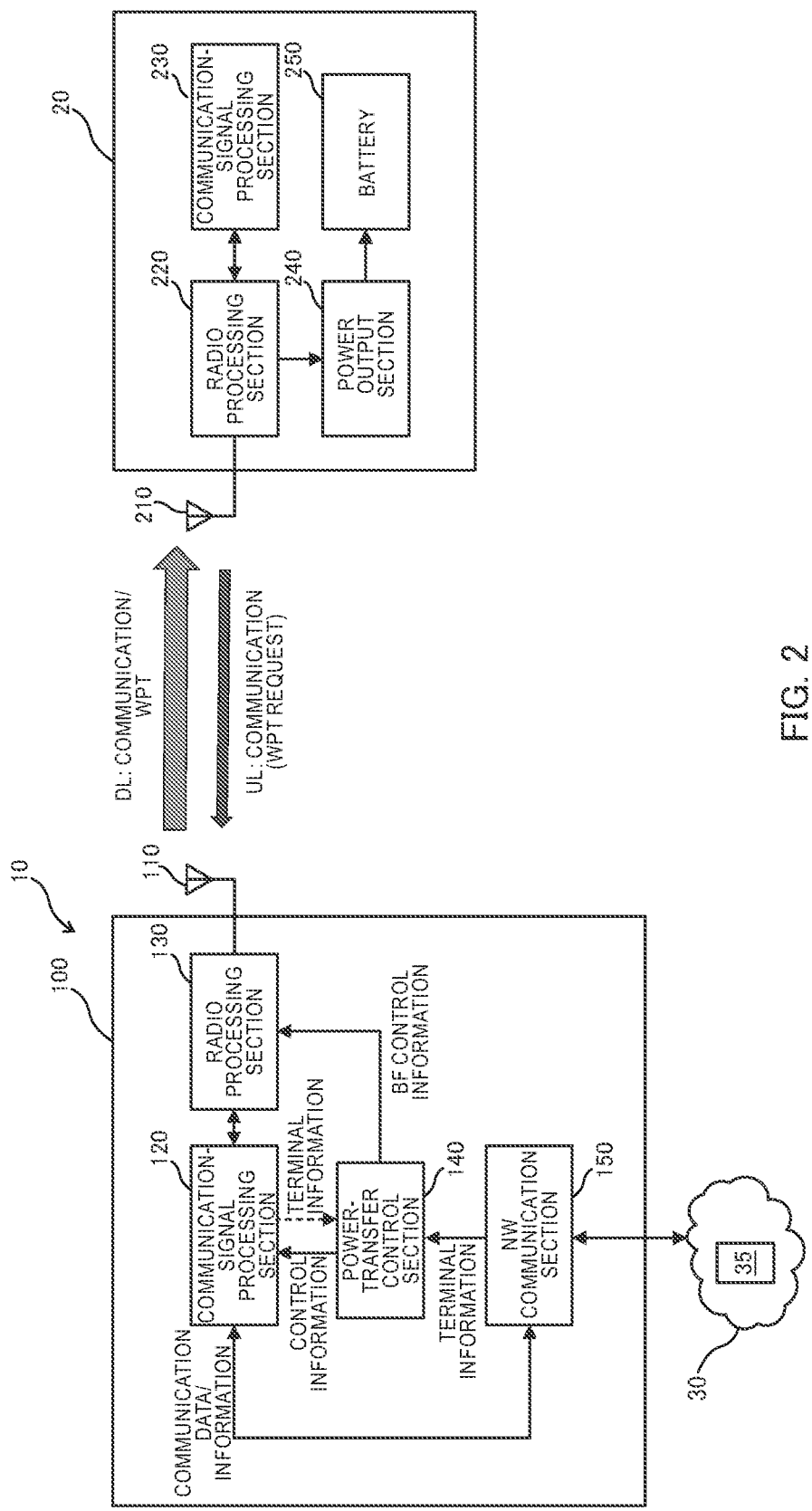
FIG. 2 is a block diagram showing an example of main configurations of a base station and a terminal apparatus (UE) that configure the system according to the embodiment.

FIG. 2 is a block diagram showing an example of main configurations of the base station 10 and the terminal apparatus 20 that configure the system according to the present embodiment. The base station 10 is provided with a base station apparatus 100 and the antenna 110. It is noted that in FIG. 2, although a single UE 20 is shown for convenience of illustration, the base station 10 can communicate with plural UEs having the same configuration as the illustrated UE 20 simultaneously or in a time-division manner, and transmit signals for wireless power transfer (signals for WPT) to the plural UEs simultaneously or in a time-division manner.

The antenna 110 is, for example, an array antenna having a large number of antenna elements as shown in FIG. 1. The antenna 110 may be single or plural. For example, a plurality of the antennas 110 may be disposed corresponding to plural sector cells.

The base station apparatus 100 is provided with a communication-signal processing section 120, a radio processing section 130, a power-transfer control section 140 and a NW (network) communication section 150. The communication-signal processing section 120 processes signals such as various kinds of user data, control information, etc. which are transmitted to and received from the UE 20. The radio processing section 130 transmits the transmission signal generated by the communication-signal processing section 120 from the antenna 110 to the UE 20, and outputs the reception signal received from the UE 20 via the antenna 110 to the communication-signal processing section 120.

The communication-signal processing section 120 generates a downlink transmission signal including the dummy signal for WPT as a signal for wireless power transfer. For example, during a downlink communication to the UE 20, the communication-signal processing section 120 may generate a downlink transmission signal including the dummy signal for WPT using a communication-unused radio resource that is not used for communications, among plural radio resources. The downlink transmission signal including the dummy signal for WPT can be generated by modulating with any type of modulation method. For example, the dummy signal for WPT may be a signal modulated at a symbol point with the maximum amplitude among plural symbol points of a digital modulation method. For example, the generation of the transmission signal may include a primary modulation such as a QAM (Quadrature Amplitude Modulation), etc. and a secondary modulation such as an OFDM (Orthogonal Frequency Multiplexing Modulation), etc. Further, the process of including the dummy signal for WPT using communication-unused radio resources in the transmission signal of the downlink communication to the UE 20 may be performed autonomously by the base station 10, or may be performed based on a request or instruction from the UE 20 or a request or instruction from a management server.

The radio processing section 130 transmits the downlink transmission signal including the dummy signal for WPT generated by the communication-signal processing section 120, to the UE 20 via the antenna 110.

During the downlink communication to the UE 20, the radio processing section 130 performs a beamforming (BF) control to form an individual beam 10B for each UE 20 or for each UE group in the target area to which plural UEs 20 belong, and performs a wireless power transfer for each UE 20 or for each UE group. The BF control for each UE 20 or for each UE group may be performed by a digital BF control in the frequency domain in the communication-signal processing section 120, or may be performed by an analog BF control in the radio processing section 130.

The power-transfer control section 140 controls the communication-signal processing section 120 to generate and transmit the transmission signal including the dummy signal for WPT to each UE 20, based on the terminal information of the plural UEs 20 located within the WPT area 10A'. For example, the power-transfer control section 140 generates BF (Beam Forming) control information for forming an individual beam 10B for the plural UEs 20, and transmits the generated information to the radio processing section 130.

The terminal information of the UE 20 may be acquired by receiving from a server 35 of a communication network 30 such as a mobile communication network, the Internet, etc., or may be acquired by receiving from each of the plural UEs 20 located within the WPT area 10A'. The server 35 is configured with one or more computer apparatuses. The server 35 may be a node provided in the communication network 30, or may be a cloud computer system (hereinafter also referred to as "cloud system") built on the communication network 30.

The terminal information includes location information of the current location of the UE 20. The terminal information may include charging information such as remaining battery level information or the like of the UE 20.

The NW communication section 150 is connected to the communication network 30 via a wired or wireless communication line, and is capable of communicating with the server 35. The NW communication section 150 is also capable of transmitting communication data or information received from the UE 20 to the communication network 30 side, and receiving communication data or information to be transmitted to the UE 20 from the communication network 30 side.

In FIG. 2, the UE 20 includes an antenna 210, a radio processing section 220, a communication-signal processing section 230, a power output section 240 and a battery 250. The radio processing section 220 transmits the transmission signal generated by the communication-signal processing section 230, from the antenna 210 to the base station 10, and outputs the reception signal received from the base station 10 via the antenna 210, to the communication-signal processing section 230.

The radio processing section 220 receives the transmission signal including the dummy signal for WPT transmitted from the base station 10. The power output section 240 includes, for example, a rectifier circuit including rectifier, and outputs an electric power of the reception signal that is acquired by receiving the transmission signal including the dummy signal for WPT, which are transmitted from the base station 10 as a reception power of direct current for battery charging (hereinafter also referred to as "reception power"). The battery 250 can be charged by the reception power outputted from the power output section 240.

Figure 3:
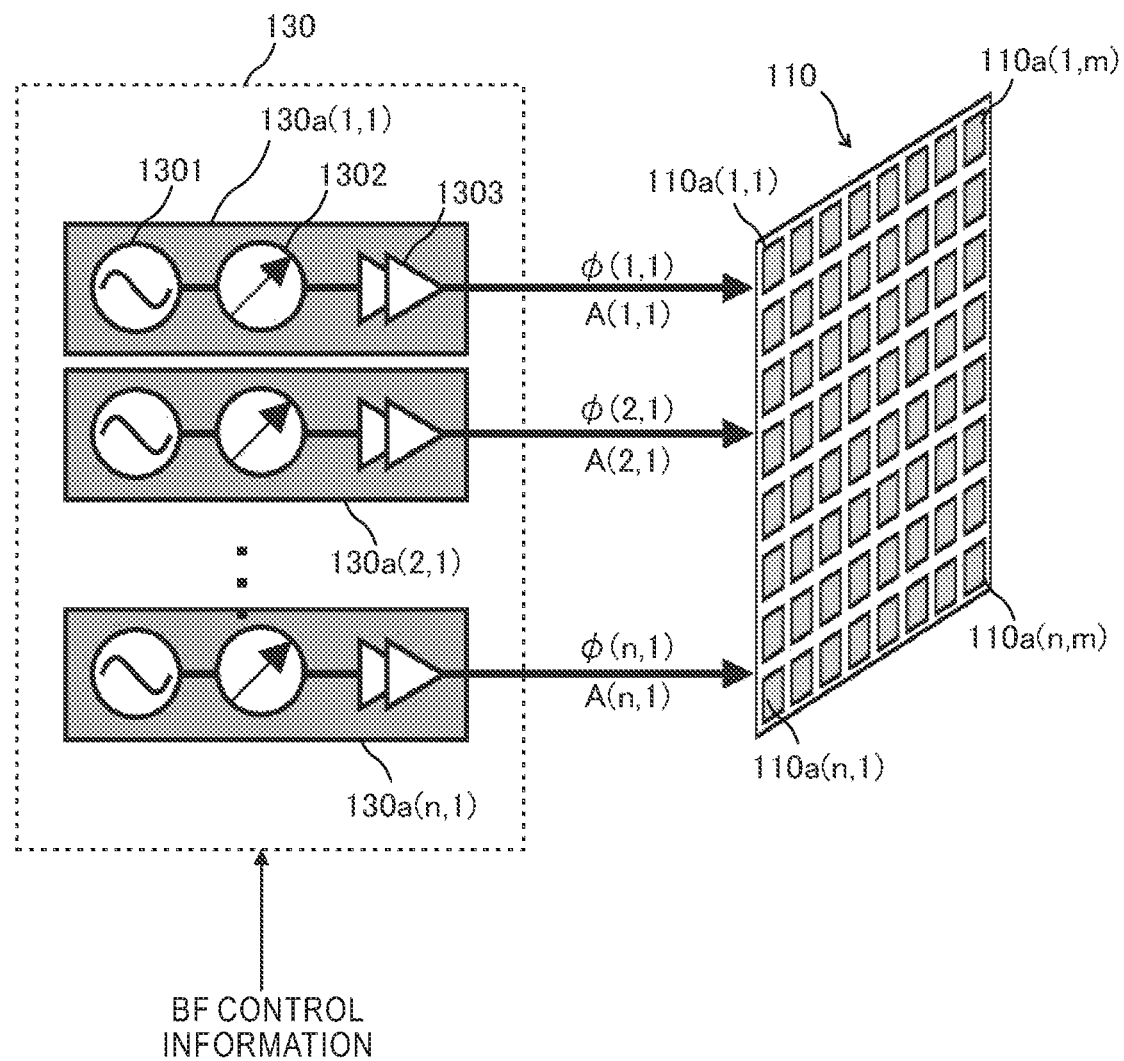
FIG. 3 is a block diagram showing a configuration example of an array antenna and a radio processing section of a base station according to the present embodiment.

FIG. 3 is a block diagram showing a configuration example of the array antenna 110 and the radio processing section 130 of the base station 10 according to the present embodiment. In FIG. 3, the array antenna 110 has a configuration in which plural (n×m pieces of) antenna elements 110a (1, 1) to 110a (n, m) are two-dimensionally disposed. The radio processing section 130 has transmission modules 130a (1, 1) to 130a (n, m) as plural transmission-signal generation sections corresponding to the antenna elements 110a (1, 1) to 110a (n, m). It is noted that in FIG. 3, for convenience of illustration, only the transmission modules 130a (1, 1) to 130a (n, 1) are shown, and an illustration of the other transmission modules 130a (2, 1) to 130a (n, m) is omitted.

Each of the transmission modules 130a (1, 1) to 130a (n, m) is provided with, for example, a high-frequency signal generation section 1301, a variable phase shifter 1302, and a high-frequency power amplifier 1303, as shown in FIG. 3. The high-frequency signal generation section 1301 generates a high frequency signal of a predetermined frequency to be supplied to the corresponding antenna element 110a, for example, by mixing the transmission signal including the dummy signal for WPT received from the communication-signal processing section 120 and the high frequency signal from a local oscillator, and blocking unnecessary frequency signal components. It is noted that, when a radio processing section for power transfer is provided separately from the radio processing section for communication as described later, the high-frequency signal generation section 1301 may be a high frequency oscillator.

The variable phase shifter 1302 changes the phase φ of the transmission signal including the dummy signal for WPT to be supplied to the corresponding antenna element 110a and outputs the transmission signal, based on the phase shift information, as beam-forming control information (BF control information) received from the power-transfer control section 140. The variable phase shifter 1302 may change both the phase φ and the amplitude of the transmission signal supplied to the corresponding antenna element 110a and output the transmission signal, based on the BF control information (phase shift information, amplitude information) received from the power-transfer control section 140.

The high-frequency power amplifier 1303 amplifies an electric power of the transmission signal with a predetermined frequency, phase and amplitude, which is outputted from the variable phase shifter 1302, to a predetermined power, and supplies the amplified power to the corresponding antenna element 110a.

By supplying the transmission signals with predetermined phases φ (1, 1) to φ (n, m) or the transmission signals with predetermined phases φ (1, 1) to φ (n, m) and amplitudes A (1, 1) to A (n, m) outputted from each of the transmission modules 130a (1, 1) to 130a (n, m) to the antenna elements 110a (1, 1) to 110a (n, m), a beamforming can be performed to form the beam 10B in a time-division manner or simultaneously for each of the plural UEs 20.

Figure 4:
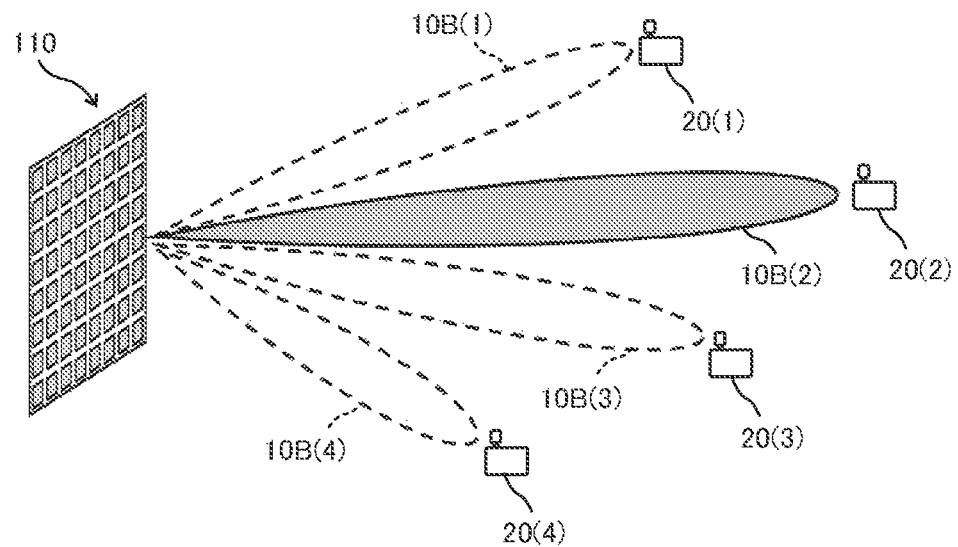
FIG. 4 is an illustration showing an example of power supply for each terminal apparatus (UE) by a time-division beamforming from the base station to plural terminal apparatuses (UE) according to the embodiment.

FIG. 4 is an illustration showing an example of power supply for each UE 20 by a time-division beamforming from the base station 10 to the plural terminal apparatuses (UEs) 20 according to the present embodiment. In the example of FIG. 4, plural beams 10B (1) to 10B (4), which respectively have a directivity directed toward each of the plural UEs 20 (1) to UE20 (4) from the array antenna 110 of the base station 10, are formed in a time-division manner. The beams 10B (1) to 10B (4) for plural UEs 20 (1) to UE20 (4) can be formed by switching regularly or irregularly with a predetermined time interval. For example, in the time period shown in FIG. 4, only the beam 10B (2) for the second UE 20 (2) is formed, and a power is supplied only to the UE 20 (2).

In a case of the time-division beamforming of FIG. 4, the directivity of the beam 10B formed for each of the plural UEs 20 (1) to UE 20 (4) can be increased and the gain during the wireless power supply can be increased.

Figure 5:
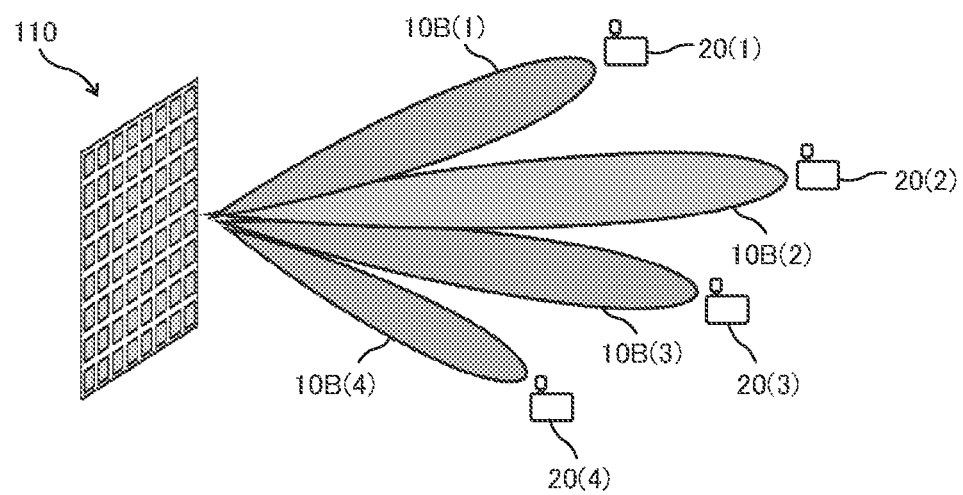
FIG. 5 is an illustration showing an example of power supply for each terminal apparatus (UE) by a multi-beam beamforming from the base station to plural terminal apparatuses (UEs) according to the embodiment.

FIG. 5 is an illustration showing an example of power supply for each UE 20 by a multi-beam beamforming from the base station 10 to the plural terminal apparatuses (UEs) 20 according to the present embodiment. In the example of FIG. 5, the plural beams 10B (1) to 10B (4), which respectively have a directivity directed toward each of the plural UEs 20 (1) to UE20 (4) from the array antenna 110 of the base station 10, are simultaneously formed.

In a case of the multi-beam beamforming of FIG. 5, it is possible to perform a wireless power supply to the large number of UEs 20 at the same time.

With respect to the above-described system that wirelessly supplies a power to the plural UEs 20 by the beamforming from the base station 10, by performing further experiments and studies by the inventors of the present invention, it is found that the power can be efficiently supplied to each UE 20 while suppressing a decrease in rectification efficiency in each UE 20 regardless of the distance from the base station 10 by performing a beamforming for each UE 20 by combining a time-division method and a multi-beam method as shown below.

Figure 6A:
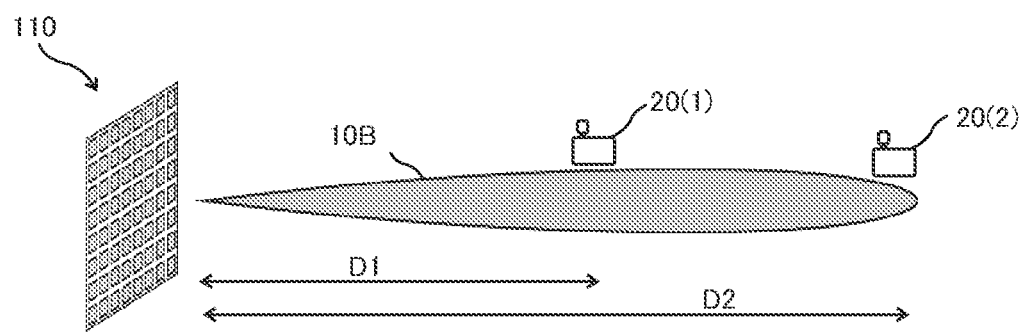
FIG. 6A is an illustration showing an example of locational relationship between a beam formed by an array antenna of a base station and plural terminal apparatuses (UE).
Figure 6B:
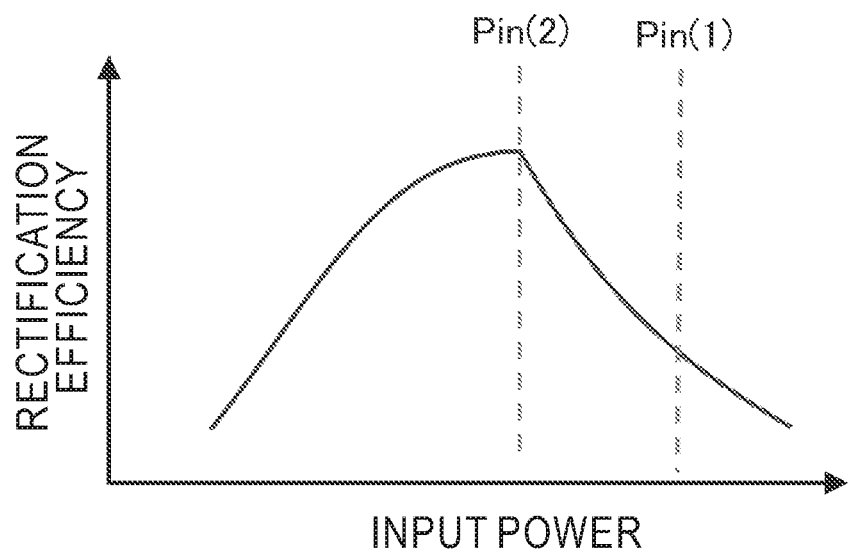
FIG. 6B is a graph showing an example of relationship between an input power and a rectification efficiency of a rectifier circuit in a power output section of a terminal apparatus (UE).

FIG. 6A is an illustration showing an example of the locational relationship between the beam 10B formed by the array antenna 110 of the base station 10 and the plural terminal apparatuses (UE) 20, and FIG. 6B is a graph showing an example of the relationship between an input power and a rectification efficiency of the rectifier circuit in the power output section 240 of the UE 20.

In a case of supplying a power by forming the beam 10B from the array antenna 110 to the UE 20 as described above, the reception power at the UE 20 changes depending on a distance from the array antenna 110 (hereinafter also referred to as "power transfer distance"). For example, in FIG. 6A, among the plural UEs 20 (1) and 20 (2) to which a power is supplied via the beam 10B, the reception power is large in the UE 20 (1) with a short power-transfer distance D1 is short, and the reception power is small in the UE 20 (2) with a long power-transfer distance D2.

On the other hand, as shown in FIG. 6B, the rectification efficiency, which is the ratio of the DC power after rectification to the input power (AC power before rectification) of the rectification circuit in the power output section 240 of the UE 20, increases depending on the input power inputted to the rectifier circuit, however the rectification efficiency decreases due to the breakdown voltage effect when the input power becomes larger than a predetermined power. For example, as shown in FIGS. 6A and 6B, a peak rectification efficiency is obtained when the reception power received by the UE 20 (2) with a long power transfer distance D2 is inputted to the rectification circuit as an input power Pin (2), and the rectification efficiency is reduced when the reception power received by the UE 20 (1) with a short power transfer distance D1 is inputted as an input power Pin (1). In this way, the reception power of the UE 20 changes depending on the power transfer distance, and high rectification efficiency cannot be obtained in the UE 20 with a power transfer distance shorter than a predetermined distance and the reception power is large. Further, if the input power to the rectifier circuit is too large, it exceeds a withstand voltage of diode that configures the rectifier circuit the possibility that the diode is destroyed is increased.

Therefore, as shown below in the system of the present embodiment, the beamforming may be controlled by combining the above-described time-division method and the multi-beam method so that the transmission signal including the dummy signal for WPT is received at a predetermined reception power in each of the plural UEs 20, based on the terminal information including the location information of the current location of the UE 20.

Figure 7:
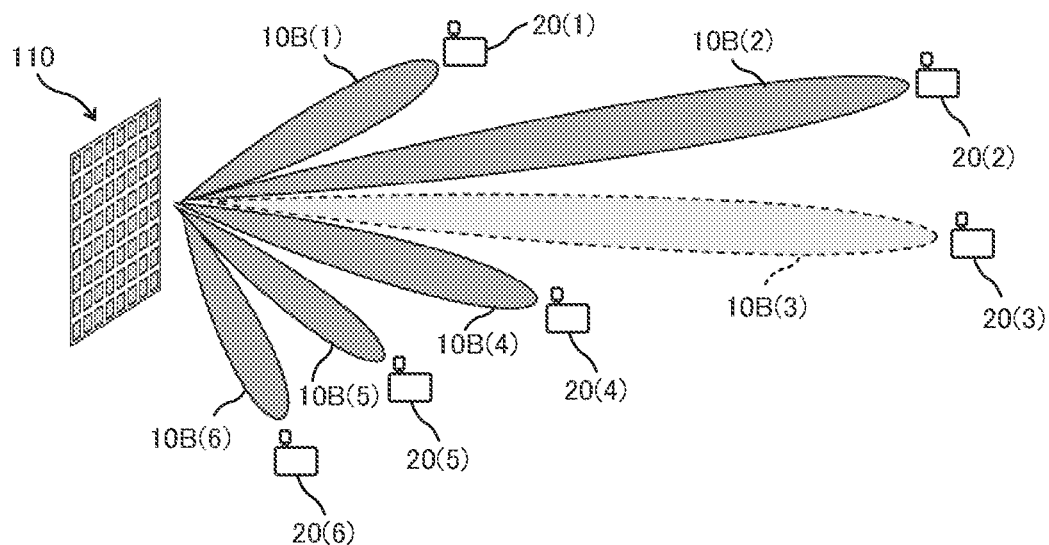
FIG. 7 is an illustration showing an example of power supply for respective terminal apparatuses (UEs) by a beamforming depending on the distances from the base station to plural terminal apparatuses (UEs) according to the embodiment.

FIG. 7 is an illustration showing an example of power supply for each UE 20 by a beamforming depending on the distances from the base station 10 to the plural terminal apparatuses (UEs) 20 according to the present embodiment. In FIG. 7, the base station 10 concurrently serving as the wireless-power transfer apparatus switches between a beamforming for long distance that forms plural beams 10B (2) and 20 (3) in a time-division method and a beam-forming for short distance that simultaneously forms plural beams 10B (1), 10B (4) to 10B (6), based on the distance from the base station 10 to each of the plural UEs 20 (1) to 20 (6), by controlling the radio processing section 130 with the power-transfer control section 140 described above.

For example, the base station 10 compares the distance from the array antenna 110 of the base station 10 with a predetermined reference distance, with respect to the plural UEs 20 (1) to 20 (6) to be supplied with power, by controlling the wireless processing section 130 with the power-transfer control section 140 described above. Herein, the power-transfer control section 140 controls the plural UEs 20 (2) and 20 (3), which are located at locations where the distances from the array antenna 110 of the base station 10 are longer than the predetermined reference distance, so as to form beams 10B (2) and 10B (3) in a time-division method by a beamforming for long distance. On the other hand, the power-transfer control section 140 simultaneously forms beams 10B (1), 10B (4) to 10B (6) by a beamforming for short distance for plural UEs 20 (1), 20 (4) to 20 (6) which are located at locations where the distances from the array antenna 110 of the base station 10 are shorter than or equal to the predetermined reference distance.

The reference distance used for the foregoing control is set, for example, so that a predetermined rectification efficiency is obtained in each of the plural UEs 20 in the entire WPT area 10A', and the transmission signal from the base station 10 is received with a predetermined reception power, based on the rectification efficiency characteristics (see FIG. 6B described above) showing a relationship between the input power and the rectification efficiency of the rectification circuit used for the power output section 240 of the UE 20. In determining the reference distance, the type of beam (for example, beam width) used in each of the beamforming for long distance and the beamforming for short distance may be considered in addition to the foregoing rectification efficiency characteristics.

Figure 8:
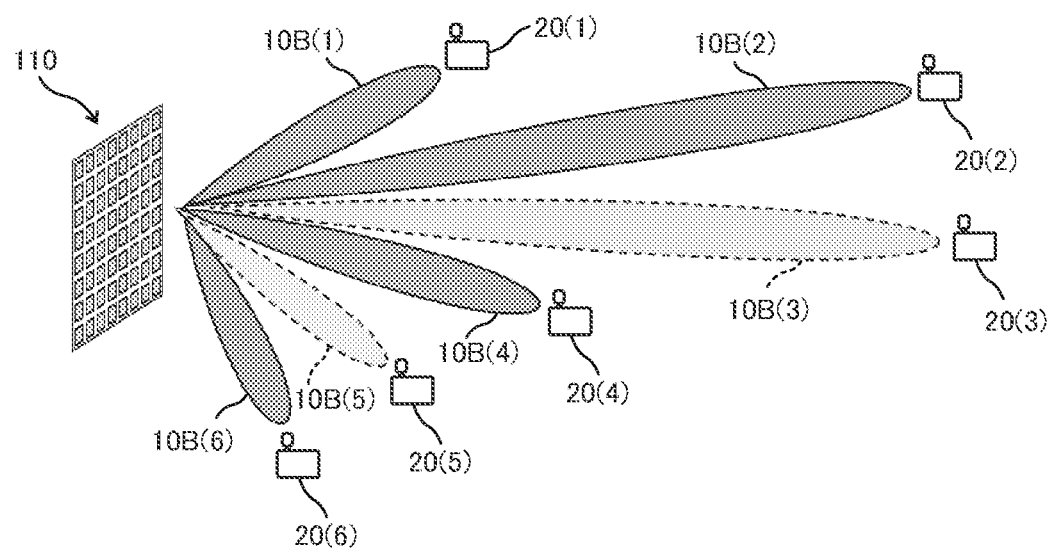
FIG. 8 is an illustration showing another example of power supply for respective terminal apparatuses (UEs) by a beamforming depending on the distances from the base station to plural terminal apparatuses (UEs) according to the embodiment.

FIG. 8 is an illustration showing another example of power supply for each UE 20 by a beamforming depending on the distances from the base station 10 to the plural terminal apparatuses (UEs) 20 according to the present embodiment. It is noted that, in FIG. 8, with respect to parts common to those in FIG. 7, the description is omitted.

In the example of FIG. 8, in the beamforming for short distance, the multi-beam method and the time-division method are further combined. For example, the power-transfer control section 140 controls some of the UEs 20 (1), 20 (4) among the plural short-distance UEs 20 (1), 20 (4) to 20 (6) which are located at locations where the distances from the array antenna 110 of the base station 10 are equal to or shorter than the predetermined reference distance, so as to simultaneously form the beams 10B (1), 10B (4) in the multi-beam method, and controls the remaining UEs 20 (5), 20 (6) to form the beams 10B (1), 10B (4) in the time-division method.

According to these beamforming controls, a predetermined power can be supplied to the plural UEs 20 in consideration of the rectification efficiency. Further, the possibility of damage to the diode due to an excess transmitted power can be reduced. That is, according to the present embodiment, it is possible to efficiently supply the predetermined power to each of the plural UEs 20 regardless of the distance from the base station 10.

It is noted that in each of the foregoing beamforming controls, the terminal information may include charging information of the battery 250 provided in each of the plural UEs 20, and the power-transfer control section 140 may control a beamforming for each of the plural UEs 20 to turn on and off the formation of the beam 10B for the UE 20 based on the charging information. In this case, it is possible to avoid a power supply to the UE 20 in which the battery 250 does not need to be charged.

In each of the foregoing beamforming controls, the terminal information may include charging information of the battery 250 provided in each of the plural UEs 20, and the power-transfer control section 140 may control a beamforming for each of the plural UEs 20 to change the type of the beam 10B (for example, beam width) formed for the UE 20 based on the charging information. In this case, it is possible to charge the battery 250 quickly by forming a kind of beam with a narrow beam width and high directivity for the UE 20 in which the battery 250 has a small amount of remaining power.

Figure 9:
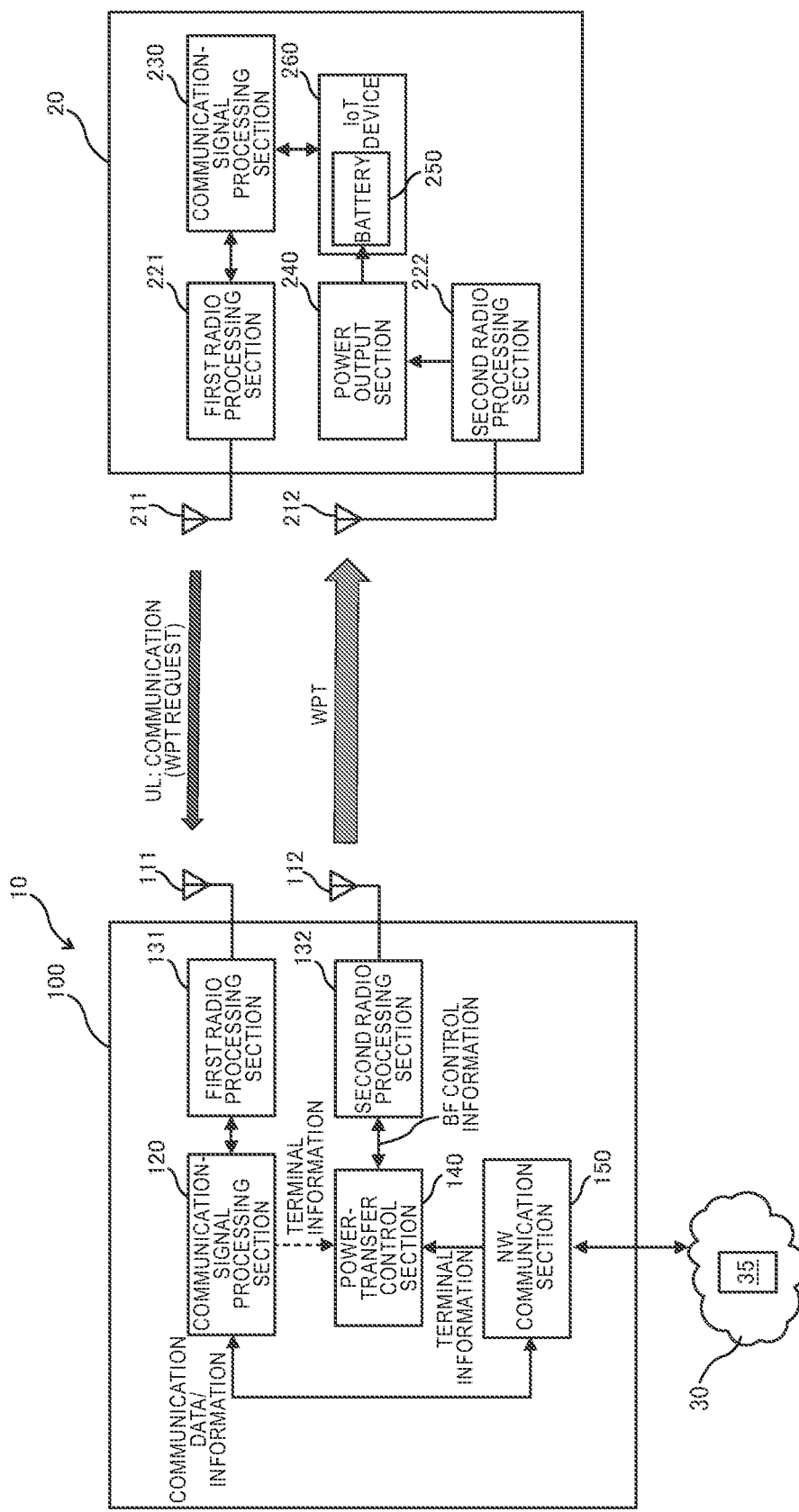
FIG. 9 is a block diagram showing another example of a main configuration of the base station and the terminal apparatus (UE) according to the embodiment.

FIG. 9 is a block diagram showing yet another example of main configurations of the base station 10 and the terminal apparatus (UE) 20 according to the present embodiment. The example in FIG. 9 is an example of a system in which the base station apparatus 100 is provided with the antenna and the radio processing section for wireless power transfer, and the UE 20 is provided with the antenna and the radio processing section for wireless power transfer and the IoT device 260 having the battery 250. It is noted that, in FIG. 9, parts common to those in the system of FIG. 2 are given the same reference numerals, and description thereof is omitted. Although a single UE 20 is shown in FIG. 9 for convenience of illustration, the base station 10 can communicate with plural UEs having the same configuration as the illustrated UE 20 simultaneously or in a time-division manner, and transmit signals for wireless power transfer (signals for WPT) to the plural UEs simultaneously or in a time-division manner.

In FIG. 9, the base station apparatus is provided with a first-radio processing section 131 that performs a radio communication with the UE 20 via an antenna for communication 111, and a second-radio processing section 132 that transmits transmission signals including the signal for wireless power transfer (signal for WPT) to the UE 20 via an antenna for power transfer 112. The antenna for communication 111 and the antenna for power transfer 112 are, for example, the array antennas described above.

The communication-signal processing section 120 processes signals such as various kinds of user data, control information, etc. transmitted to and received from the UE 20. The first-radio processing section 131 transmits the transmission signal generated by the communication-signal processing section 120 from the antenna 111 to the UE 20, and outputs the reception signal received from the UE 20 via the antenna 111 to the communication-signal processing section 120.

The second-radio processing section 132 transmits transmission signals including the signal for wireless power transfer (signal for WPT) to the UE 20 via the antenna 112 by beamforming controlled based on the BF control signal received from the power-transfer control section 140.

The power-transfer control section 140 generates and outputs the BF control signal, based on the terminal information of each of the plural UEs 20 which is acquired by receiving from the server 35 or the terminal information which is acquired by receiving from each of the plural UEs 20.

The UE 20 is provided with a first-radio processing section 221 for performing a radio communication with the base station 10 via an antenna for communication 211, and a second-radio processing section 222 for receiving transmission signals including the signal for wireless power transfer (signal for WPT) from the base station 10 via an antenna for reception power 212.

The communication-signal processing section 230 generates communication transmission signals of data, control information, etc. and outputs them to the first-radio processing section 221, and processes the reception signals received via the antenna for communication 211 and the first-radio processing section 221 and outputs data, control information, etc. to the IoT device 260.

The second-radio processing section 222 receives the transmission signals including the signal for wireless power transfer (signal for WPT) transmitted from the base station 10 via the antenna for reception power 212, and passes the transmission signals to the power output section 240. The power output section 240 includes, for example, a rectifier, and outputs the electric power of the reception signal that is acquired by receiving the transmission signals including the signal for wireless power transfer (signal for WPT) from the base station 10, as a reception power for battery charging. The battery 250 built into the IoT device 260 can be charged by the reception power outputted from the power output section 240.

As described above, according to the present embodiment, it is possible to efficiently supply the predetermined power to each of the plural UEs (terminal apparatuses) 20.

It is noted that, the process steps and configuration elements of the wireless-power transfer apparatus, communication system and wireless-power transfer system described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various kinds of radio communication apparatuses, base station apparatus (Node B, Node G), terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: wireless-power transfer apparatus, communication relay apparatus (base station, AP)
10A: communication area
10A': WPT area
10B: beam
20: terminal apparatus
100: base station apparatus
110: antenna, array antenna
111: antenna for communication
112: antenna for power transfer
120: communication-signal processing section
130: radio processing section
130a: transmission-signal generation section (transmission module)
1301: high-frequency signal generation section
1302: variable phase shifter
1303: high-frequency power amplifier
131: first-radio processing section
132: second-radio processing section
140: power-transfer control section
210: antenna
211: antenna for communication
212: antenna for reception power
220: radio processing section
221: first-radio processing section
222: second-radio processing section
230: communication-signal processing section
240: power output section
250: battery
260: IoT device

The invention claimed is:

1. A wireless-power transfer apparatus for wirelessly transmitting power to plural terminal apparatuses, comprising:
a radio processing section for transmitting a signal for wireless power transfer to each of the plural terminal apparatuses via plural beams, by a beamforming for forming the plural beams against the plural terminal apparatuses simultaneously or at staggered times;
an information acquisition section for acquiring terminal information including location information of a current location of the terminal apparatus for each of the plural terminal apparatuses; and
a control section for controlling the beamforming so that the signal for wireless power transfer is received at a predetermined reception power in each of the plural terminal apparatuses, based on the terminal information of each of the plural terminal apparatuses, and
wherein the control section switches between a beamforming for long distance in which the plural beams are formed in a time-division manner and a beamforming for short distance in which the plural beams are simultaneously formed, based on a distance from the wireless-power transfer apparatus to each of the plural terminal apparatuses;
wherein the radio processing section comprises:
an array antenna in which plural antenna elements are disposed two-dimensionally or three-dimensionally, and
plural signal generation sections that are provided to correspond to the plural antenna elements and generate the signal for wireless power transfer, and
wherein the radio processing section changes a phase or both of a phase and an amplitude of the signal for wireless power transfer that is respectively supplied to the plural antenna elements, based on beam-forming control information from the control section.

2. The wireless-power transfer apparatus according to claim 1,
wherein the control section controls to form the beam by the beamforming for long distance against plural terminal apparatuses that are located at locations where the distance is longer than a predetermined reference distance among the plural terminal apparatuses, and to form the beam by the beamforming for short distance against plural terminal apparatuses that are located at locations where the distance is shorter than or equal to the predetermined reference distance.

3. The wireless-power transfer apparatus according to claim 2,
wherein the radio processing section comprises:

an array antenna in which plural antenna elements are disposed two-dimensionally or three-dimensionally, and plural signal generation sections that are provided to correspond to the plural antenna elements and generate the signal for wireless power transfer, and wherein the radio processing section changes a phase or both of a phase and an amplitude of the signal for wireless power transfer that is respectively supplied to the plural antenna elements, based on beam-forming control information from the control section.

4. The wireless-power transfer apparatus according to claim 2, wherein the terminal information includes charging information on a battery provided in each of the plural terminal apparatuses, and wherein the control section controls the beamforming so as to turn on and off a beam formation against the terminal apparatus based on the charging information, for each of the plural terminal apparatuses.

5. The wireless-power transfer apparatus according to claim 2, wherein the terminal information includes charging information on a battery provided in each of the plural terminal apparatuses, and wherein the control section controls the beamforming so as to change a type of the beam formed against the terminal apparatus based on the charging information, for each of the plural terminal apparatuses.

6. The wireless-power transfer apparatus according to claim 2, wherein the wireless-power transfer apparatus is concurrently used as a communication relay apparatus capable of performing a radio communication with the plural terminal apparatuses.

7. The wireless-power transfer apparatus according to claim 6, wherein the wireless-power transfer apparatus comprises:

a first-radio processing section for performing a radio communication with each of the plural terminal apparatuses via an antenna for communication; and a second-radio processing section for transmitting the signal for wireless power transfer to each of the plural terminal apparatuses via an antenna for power transfer by the beamforming.

8. The wireless-power transfer apparatus according to claim 7, wherein the wireless-power transfer apparatus is a base station of a mobile communication system or an access point apparatus of a wireless LAN.

9. The wireless-power transfer system according to claim 8, wherein the control section controls to form the beam by the beamforming for long distance against plural terminal apparatuses that are located at locations where the distance is longer than a predetermined reference distance among the plural terminal apparatuses, and to form the beam by the beamforming for short distance against plural terminal apparatuses that are located at locations where the distance is shorter than or equal to the predetermined reference distance.

10. The wireless-power transfer apparatus according to claim 1, wherein the terminal information includes charging information on a battery provided in each of the plural terminal apparatuses, and wherein the control section controls the beamforming so as to turn on and off a beam formation against the terminal apparatus based on the charging information, for each of the plural terminal apparatuses.

11. The wireless-power transfer apparatus according to claim 1, wherein the terminal information includes charging information on a battery provided in each of the plural terminal apparatuses, and wherein the control section controls the beamforming so as to change a type of the beam formed against the terminal apparatus based on the charging information, for each of the plural terminal apparatuses.

12. The wireless-power transfer apparatus according to claim 1, wherein the wireless-power transfer apparatus is concurrently used as a communication relay apparatus capable of performing a radio communication with the plural terminal apparatuses.

13. The wireless-power transfer apparatus according to claim 12, wherein the wireless-power transfer apparatus comprises:

a first-radio processing section for performing a radio communication with each of the plural terminal apparatuses via an antenna for communication; and a second-radio processing section for transmitting the signal for wireless power transfer to each of the plural terminal apparatuses via an antenna for power transfer by the beamforming.

14. The wireless-power transfer apparatus according to claim 12, wherein the wireless-power transfer apparatus is a base station of a mobile communication system or an access point apparatus of a wireless LAN.

15. A wireless-power transfer system comprising:

the wireless-power transfer apparatus according to claim 1 and;

plural terminal apparatuses, and wherein each of the plural terminal apparatuses comprises:

a radio processing section for receiving the signal for wireless power transfer transmitted from the wireless-power transfer apparatus; and a power output section for outputting a power of reception signal that is acquired by receiving the signal for wireless power transfer, as a reception power.

16. The wireless-power transfer system according to claim 15, wherein each of the plural terminal apparatuses comprises:

a first-radio processing section for performing a radio communication with the communication relay apparatus via an antenna for communication; and a second-radio processing section for receiving the signal for wireless power transfer from the communication relay apparatus via an antenna for power transfer.

17. A method for wirelessly transmitting power to plural terminal apparatuses, comprising:

transmitting a signal for wireless power transfer to each of the plural terminal apparatuses via plural beams, by a beamforming for forming the plural beams against the plural terminal apparatuses simultaneously or at staggered times;

acquiring terminal information including location information of a current location of the terminal apparatus for each of the plural terminal apparatuses;

controlling the beamforming so that the signal for wireless power transfer is received at a predetermined reception power in each of the plural terminal apparatuses, based on the terminal information of each of the plural terminal apparatuses, and switching between a beamforming for long distance in which the plural beams are formed in a time-division manner and a beamforming for short distance in which the plural beams are simultaneously formed, based on a distance from the wireless-power transfer apparatus to each of the plural terminal apparatuses;

wherein the radio processing section comprises:

an array antenna in which plural antenna elements are disposed two-dimensionally or three-dimensionally, and plural signal generation sections that are provided to correspond to the plural antenna elements and generate the signal for wireless power transfer, and wherein the radio processing section changes a phase or both of a phase and an amplitude of the signal for wireless power transfer that is respectively supplied to the plural antenna elements, based on beam-forming control information from the control section.

18. A non-transitory computer readable medium containing software that is executed by a computer or processor provided in a wireless-power transfer apparatus for wirelessly transmitting power to plural terminal apparatuses, the software comprising:

executable code that transmits a signal for wireless power transfer to each of the plural terminal apparatuses via plural beams, by a beamforming for forming the plural beams against the plural terminal apparatuses simultaneously or at staggered times;

executable code that acquires terminal information including location information of a current location of the terminal apparatus for each of the plural terminal apparatuses; and executable code that controls the beamforming so that the signal for wireless power transfer is received at a predetermined reception power in each of the plural terminal apparatuses, based on the terminal information of each of the plural terminal apparatuses, and executable code that switches between a beamforming for long distance in which the plural beams are formed in a time-division manner and a beamforming for short distance in which the plural beams are simultaneously formed, based on a distance from the wireless-power transfer apparatus to each of the plural terminal apparatuses;

wherein the radio processing section comprises:

an array antenna in which plural antenna elements are disposed two-dimensionally or three-dimensionally, and plural signal generation sections that are provided to correspond to the plural antenna elements and generate the signal for wireless power transfer, and wherein the radio processing section changes a phase or both of a phase and an amplitude of the signal for wireless power transfer that is respectively supplied to the plural antenna elements, based on beam-forming control information from the control section.

* * * * *